J. M. FARNHAM,

Assignor to Woven Wire Mattress Co.

BEDSTEAD-FRAME.

No. 7,704. Reissued May 29, 1877.

Attest,

John T. Peters.

Geo. D. Jewell

Inventor,

John M. Farnham assignor to The Woven Wire Mattress Company

By Theo. G. Ellis.

Attys

THE NORRIS PETERS CO., PHOTO-LITHO., WASHINGTON, D. C.

UNITED STATES PATENT OFFICE.

J. M. FARNHAM, OF HARTFORD, CONNECTICUT, ASSIGNOR TO WOVEN WIRE MATTRESS COMPANY, OF SAME PLACE.

IMPROVEMENT IN BEDSTEAD-FRAMES.

Specification forming part of Letters Patent No. 97,375, dated November 30, 1869; reissue No. 7,704, dated May 29, 1877; application filed March 26, 1877.

*To all whom it may concern:*

Be it known that J. M. FARNHAM, of Hartford, in the county of Hartford, and State of Connecticut, did invent a new and Improved Bedstead-Frame; and I do hereby declare that the following is a full, clear, and exact description thereof, which will enable others skilled in the art to make and use the same, reference being had to the accompanying drawings, forming part of this specification, in which—

Figure 1:
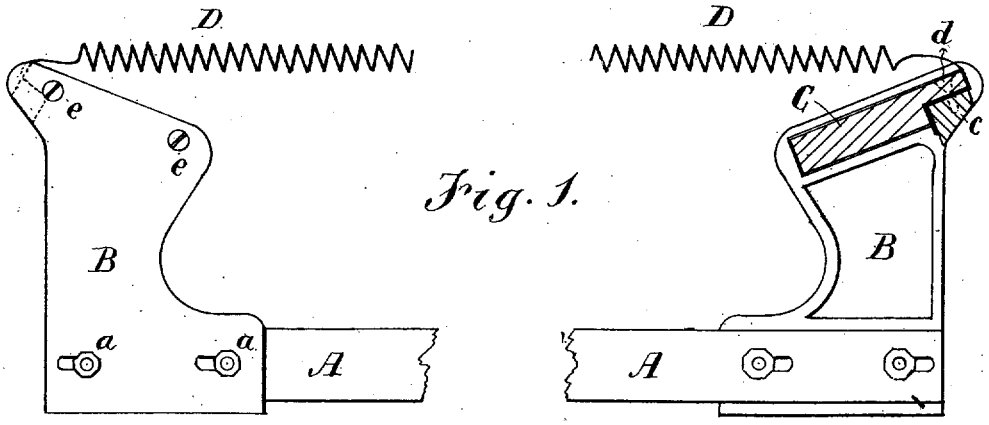
Figure 2:
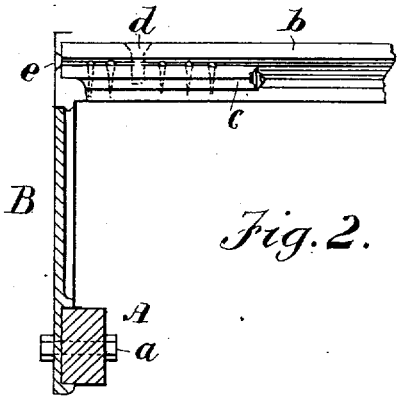

Figure 1 represents a side view, partly in section, of my improved bedstead-frame. Fig. 2 is a detail transverse section of the same.

Similar letters of reference indicate corresponding parts.

My invention relates to a new frame, which is provided with an elastic or flexible sheet or fabric for the support of the bedding. The frame is made of proper size to be inserted within any ordinary bedstead.

My invention consists in the combination of the side bars and end bars, with the end bars elevated above the side bars in such a manner that the elastic fabric, stretched from end bar to end bar, can extend the entire width of the frame over the side bars, and an elastic fabric attached to the end bars only of the frame; and it also consists in the combination of the side bars and end bars of the frame, connected together by standards or corner-irons B. By this arrangement the fabric is securely held.

A in the drawing represents one of the two side bars of the frame. These bars are supported on suitable legs or posts, or may rest directly upon the floor.

To the ends of each side bar are secured, by means of bolts *a a*, upward-projecting standards B B, made of metal or other suitable material.

These bolts pass through short longitudinal slots in the standards, whereby the latter may be adjusted to stretch the cloth when desired.

These standards are grooved or have ribs on their inner sides, by which the ends of the end bars C C are held. The end bars connect the side bars and their standards with each other.

Each end bar is made of two pieces or bars, *b* and *c*, both of equal and full length. Between them are held the ends of the fabric constituting the bed-bottom, and clamped by means of screws or bolts *d d*.

The end bars are held in inclined positions, as shown in Fig. 1, by the ribs or grooves on the standards, and are held in place by means of screws *e*, which are fitted through the standards, or by other equivalent devices.

By being in the inclined position the end bars are arranged to hold the fabric secure, without coming in contact with its under side more than is necessary.

It will be observed that the purpose of this method of attaching the fabric to the frame is to give to the fabric its greatest elasticity, by attaching it at its ends only, and at the same time making it as nearly the full size of the frame as could be well done, while it is substantially free from contact with the frame when used, excepting at its ends, where it is rigidly secured to the end bars.

The bolts *a* fit through slots to make the standards adjustable on the side bars, whereby the end bars can be set any suitable distance apart, for the fabric to be stretched or slackened.

Having thus fully described my invention, I claim as new and desire to secure by Letters Patent—

1. The combination of the side bars and end bars and elastic coiled-wire fabric D, attached only to the end bars, with the end bars of the frame elevated above the side bars, so that the fabric will be suspended above the side bars from end to end of the frame.

2. The combination, in a removable bed-bottom or bedstead-frame, of the side bars A, standards or corner-pieces B, end bars C, and the elastic fabric D, combined and arranged substantially as and for the purposes specified.

3. The inclined double end bars C of a bedstead-frame, arranged substantially as and for the purpose herein shown and described.

4. The standards B, constructed as described, arranged longitudinally adjustable on the side bars of a bedstead-frame, to permit the inclined end bars to be set a suitable distance apart, as set forth.

WILLIAM J. MYERS,
*Secretary Woven Wire Mattress Company.*

Witnesses:
THEO. G. ELLIS,
JOHN T. PETERS.